(No Model.) 2 Sheets—Sheet 1.

A. J. MARTIN & E. J. CORSER.
SEED DISTRIBUTING APPARATUS.

No. 430,135. Patented June 17, 1890.

Witnesses
Edw. F. Simpson, Jr.
Arthur C. Clarke.

Inventors
Andrew J. Martin
Edson J. Corser
By Attorney
J. J. Peyton (No Model.) 2 Sheets—Sheet 2.
A. J. MARTIN & E. J. CORSER.
SEED DISTRIBUTING APPARATUS.
No. 430,135. Patented June 17, 1890.
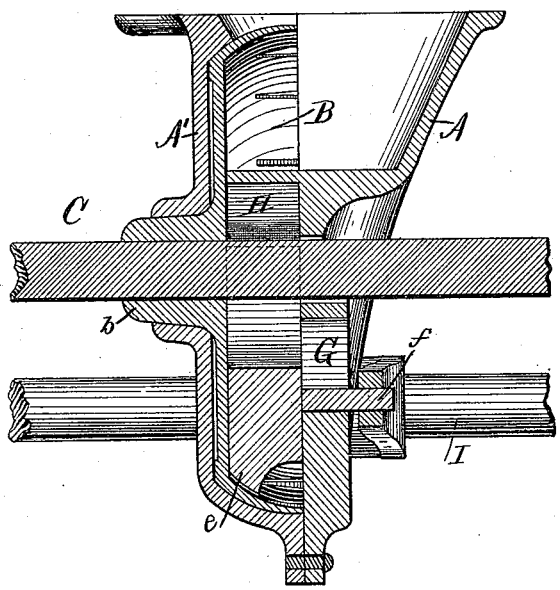
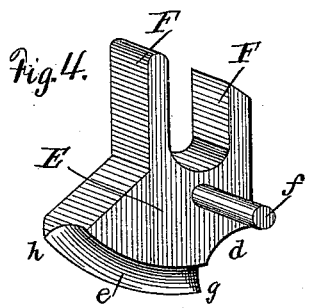
WITNESSES:
Edw. F. Simpson, Jr.
Arthur C. Clarke.
INVENTORS
Andrew J. Martin,
Edson J. Corser,
BY
J. D. Peyton
ATTORNEY.

UNITED STATES PATENT OFFICE.

ANDREW J. MARTIN AND EDSON J. CORSER, OF MACEDON, NEW YORK.

SEED-DISTRIBUTING APPARATUS.

SPECIFICATION forming part of Letters Patent No. 430,135, dated June 17, 1890.

Application filed February 24, 1890. Serial No. 341,604. (No model.)

*To all whom it may concern:*

Be it known that we, ANDREW J. MARTIN and EDSON J. CORSER, both of Macedon, in the county of Wayne and State of New York, have invented certain new and useful Improvements in Seed-Distributing Apparatus, of which the following is a specification.

Our invention relates to improvements in seed-distributers of the well-known forced-feed class, involving the employment of a series of feed cups or casings, to which the seed is supplied from a hopper above, and from which the seed is forced in regulated quantities by feed-wheels rotating within them; and our object is to provide improved means, as hereinafter claimed, for regulating the discharge of seed from the feed-cups.

Figure 1:
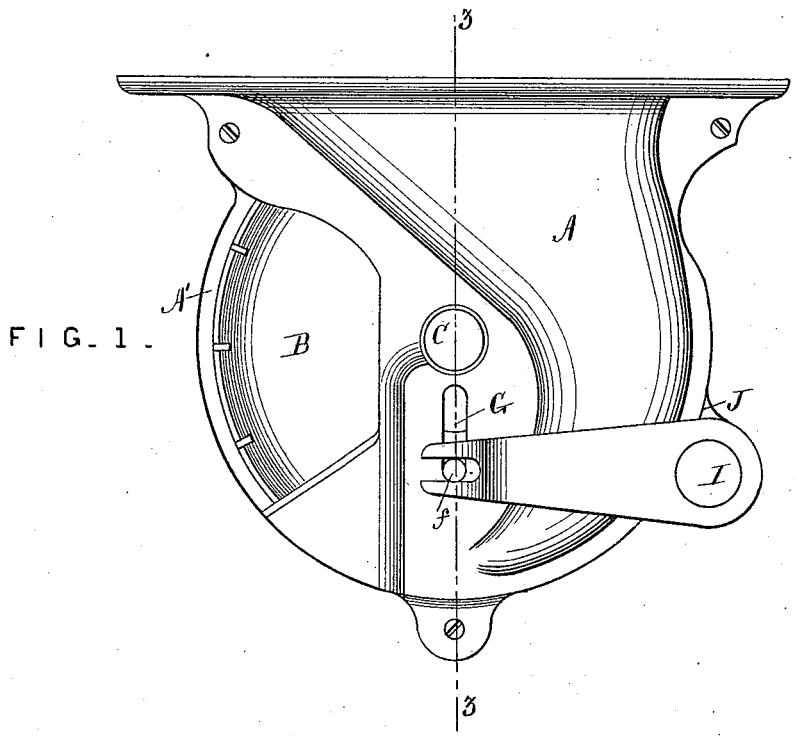
Figure 2:
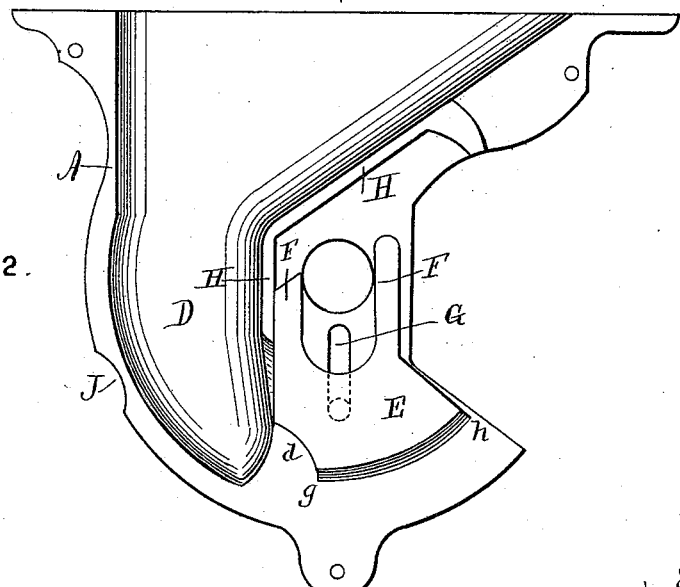

In the accompanying drawings, which show one feed-cup, feed-wheel, &c., of the series to be employed, Figure 1 is a side elevation; Fig. 2, a view in elevation with one section of the feed-cup removed; Fig. 3, a vertical section on the line 3 3 of Fig. 1, and Fig. 4 a view in perspective of the feed-regulator.

The feed cup or casing is composed of two detachably-connected sections A A', and any desired number of them may be employed, attached to a suitable seed box or hopper in a well-known way. Within the feed-cup is mounted the feed-wheel B, provided with suitable ribs or teeth projecting inwardly from its rim to engage with and feed along the seed as the wheel rotates. The feed-wheel is provided with a trunnion $b$, turning in a bearing in the section A' of the cup, and is adapted to be slid into position on the driving-shaft C and to be detachably secured thereto, so as to rotate therewith, by a key or otherwise. The driving-shaft is rotated as usual, and the seed supplied to the cup passes down to and along the feed channel or throat D and is discharged, as forced along by the feed-wheel, by way of an opening in the side of the feed-cup section A.

Within the feed-cup is loosely arranged an adjustable throat-piece or feed-regulator E, by which to vary the area of the feedway or discharge-passage of the throat or feed-channel D. This throat-piece is slotted or provided with forks F F at top to embrace and slide upon the driving-shaft, and has a stud $f$ secured to its side and projecting through a slot G in the feed-cup section A. The throat-piece bears and is adapted to slide against the internal partition or flange H of the section A of the feed-cup, which flange constitutes one side or wall of the feed-channel or throat. The throat-piece is thus made to constitute an adjustable continuation or prolongation of the flange, which, together with driving-shaft and slot G entered by stud $f$, serve as guideways for the throat-piece, which is prevented from moving otherwise than in a right line during adjustment. At its lower edge the throat-piece is curved. The arc of curvature of the throat-piece is by preference slightly eccentric to that of the feed wheel and cup, so that the area of the feedway is gradually increased to a slight extent from the end $g$ of the throat-piece, to which the seed is first presented, to the opposite or discharge end $h$ of the throat-piece. This eccentric curvature of the throat-piece, though not absolutely necessary, is deemed preferable, as it prevents possibility of clogging. The throat-piece is preferably cut away and curved, as at $d$, to facilitate the feed of the seed, and provided with the edge flange $e$ at its back or next the feed-cup section A', which serves to contract the width of the discharge-channel.

The means employed for adjusting the throat-piece, as shown, consist of a rock-shaft I, having bearing in the seed-cup at J, and provided with a crank-arm slotted at its outer end to embrace the stud $f$ of the throat-piece. By rocking the adjusting-shaft the throat-piece may be slid up or down. In so moving the throat-piece it reciprocates rectilinearly, it should be noticed, thus always maintaining the discharge-channel at the throat-piece of the desired shape, whether increased or diminished in area, and guarding against clogging and irregular working.

We claim as our invention—

1. The combination of the feed-cup having the throat or feed channel, the feed-wheel, the driving-shaft, and the rectilinearly-reciprocating throat-piece supported and guided within the feed-cup, and curved at its lower edge from its end to which the seed is first presented to its opposite end, from which the seed passes to be discharged, substantially as and for the purpose set forth.

2. The combination of the feed-cup having the throat or feed-channel, the feed-wheel, the driving-shaft, and the sliding throat-piece, embracing the driving-shaft and provided with the stud projecting through a slot in the seed-cup, and by way of which the throat-piece is adjusted, substantially as and for the purpose set forth.

3. The throat-piece slotted to embrace the driving-shaft and having the curved edge, substantially as and for the purpose set forth.

In testimony whereof we have hereunto subscribed our names.

ANDREW J. MARTIN.
EDSON J. CORSER.

Witnesses:
ISAAC DEAN,
DAVID W. COURTER.